United States Patent [19]
Cahill et al.

[11] Patent Number: 5,475,480
[45] Date of Patent: Dec. 12, 1995

[54] ELECTROGRAPHIC PROCESS

[75] Inventors: Douglas A. Cahill, Belchertown; Donald A. Brault, Granby; Richard S. Himmelwright, Wilbraham, all of Mass.

[73] Assignee: Rexham Graphics Inc., South Hadley, Mass.

[21] Appl. No.: 334,426

[22] Filed: Nov. 4, 1994

Related U.S. Application Data

[63] Continuation of Ser. No. 198,954, Feb. 18, 1994, abandoned, which is a continuation of Ser. No. 115,563, Sep. 3, 1993, Pat. No. 5,363,179, which is a continuation-in-part of Ser. No. 42,278, Apr. 2, 1993, abandoned.

[51] Int. Cl.[6] .............................. G03G 15/14; B41C 3/00
[52] U.S. Cl. .................. 655/278; 156/235; 156/238; 156/240; 156/241; 156/247; 430/126
[58] Field of Search ...................... 355/277–281; 156/230, 233, 238, 235, 240, 241, 247, 249, 344; 428/914, 195; 430/126, 199, 200, 252, 254, 348; 503/227; 346/135.1

[56] References Cited

U.S. PATENT DOCUMENTS

| | | | |
|---|---|---|---|
| 3,567,571 | 11/1967 | Martinovich | 161/206 |
| 3,985,602 | 10/1976 | Stuart | 156/235 |
| 4,007,489 | 2/1977 | Helmberger et al. | 358/78 |
| 4,322,467 | 3/1982 | Heimbach et al. | 428/200 |
| 4,555,436 | 11/1985 | Geurtsen et al. | 428/200 |
| 4,569,584 | 2/1986 | St. John et al. | 355/77 |
| 4,581,266 | 4/1986 | Magnotta | 428/40 |
| 4,686,163 | 8/1987 | Ng et al. | 430/47 |
| 4,731,542 | 3/1988 | Doggett | 250/548 |
| 4,875,961 | 10/1989 | Oike et al. | 156/234 |
| 4,965,242 | 10/1990 | De Boer et al. | 503/227 |
| 4,983,487 | 1/1991 | Gilreath | 430/126 |
| 5,071,728 | 12/1991 | Watts | 430/126 |
| 5,102,768 | 4/1992 | Light et al. | 430/126 |
| 5,108,865 | 4/1992 | Zwaldo et al. | 430/126 |
| 5,139,996 | 8/1992 | Boyce et al. | 503/227 |
| 5,141,916 | 8/1992 | Katayama et al. | 503/227 |
| 5,210,068 | 5/1993 | Egashiva et al. | 503/227 |
| 5,217,793 | 6/1993 | Yamane et al. | 428/195 X |
| 5,244,524 | 9/1993 | Yamane | 156/230 |
| 5,250,133 | 10/1993 | Kawamuza et al. | 156/240 |
| 5,269,865 | 12/1993 | Kushida et al. | 156/234 |
| 5,269,866 | 12/1993 | Kushida et al. | 156/234 |
| 5,270,282 | 12/1993 | Hirst et al. | 428/195 X |
| 5,273,808 | 12/1993 | Mano et al. | 428/195 |
| 5,280,005 | 1/1994 | Nakajima et al. | 503/227 |
| 5,281,573 | 1/1994 | Kawasaki et al. | 503/227 |
| 5,286,521 | 2/1994 | Matsuda et al. | 427/146 |
| 5,286,559 | 2/1994 | Kaneko et al. | 428/341 |
| 5,292,710 | 3/1994 | Egashiza et al. | 503/227 |
| 5,294,591 | 3/1994 | Egashiza et al. | 503/227 |
| 5,296,444 | 3/1994 | Saiki et al. | 503/227 |

FOREIGN PATENT DOCUMENTS 0437073  7/1991  European Pat. Off. .

*Primary Examiner*—Matthew S. Smith
*Attorney, Agent, or Firm*—Breneman, Georges & Krikelis

[57] ABSTRACT

A novel two step process is disclosed for the manufacture of protected, distortion-free, full-color electrographic images for use on large format posters, billboards and the like. A novel electrographic element, which is used in the process, comprises a carrier layer; optionally, a protective layer; a conductive layer; a dielectric layer; and a substantially tack-free, adhesive layer which is activated at a pressure and a temperature which is above ambient pressure and temperature of the electrographic element. The novel electrographic imaging process comprises: A) producing a toned image layer on the surface of the electrographic element, so that the toned image layer is adhered to the surface of the adhesive layer; and B) pressure laminating the receptor substrate at an elevated temperature to the toned image layer to form the completed electrographic image. Optionally, the carrier layer is stripped from the conductive or protective layer which then serves to protect the electrographic image from abrasion and environmental contaminants. Alternatively, the carrier layer is conductive and, along with the conductive layer (if present), is stripped from the dielectric layer which then serves to protect the electrographic image from abrasion and environmental contaminants.

16 Claims, 7 Drawing Sheets

ELECTROGRAPHIC PROCESS

CROSS REFERENCE TO RELATED APPLICATIONS

This is a continuation of application Ser. No. 08/198,954 which is now abandoned, which is a continuation application of pending prior application Ser. No. 08/115,563 filed Sep. 03, 1993, which is a continuation-in-part of abandoned application Ser. No. 08/042,278, filed Apr. 2, 1993.

BACKGROUND OF THE INVENTION

1. Field of the Invention

This invention relates to electrographic processes for making color images. More particularly, this invention relates to electrographic processes and the elements used therein for the production of large size, full color images.

2. Description of Related Art

The use of electrographic processes in the manufacture of multicolor images is well known in the art. In such processes, an electrostatic latent image is produced directly by imagewise depositing charge onto an accepting dielectric surface. Typically, styli are used to create these charge patterns and are arranged in linear arrays across the width of the moving dielectric surface. Such processes and the required apparatus are disclosed, for example, in U.S. Pat. Nos. 4,007,489; 4,731,542; and 4,569,584. In U.S. Pat. No. 4,569,584, only one stylus array is used and the accepting surface web is traversed to-and-fro to make successive images, the toning stations being disposed on either side of the single charging station. In the other designated U.S. patents, the electrographic printer consists of three or more printing stations in sequence, each containing charging arrays and toning stations. In all of the disclosed processes, a multicolor toner image is assembled on an accepting surface of a support and fixed there for display.

A method for transferring a fixed image, such as an electrographically produced toner image, from an initial substrate to a final substrate is disclosed in U.S. Pat. No. 4,983,487. The disclosed method employs an adhesive-coated film to lift the image from its initial substrate and to secure it to the final substrate. The film remains in place after the transfer is completed and serves to encapsulate and protect the image. The initial substrate remains intact and may be reused.

A transfer process is disclosed in U.S. Pat. No. 5,102,768 for providing a non-electrostatically transferred toned image. In this process, an electrostatic latent image is conventionally formed on the surface of an element and that element is conventionally developed into a visible image by applying toner powder. The toned image is then thermally transferred from the surface of an element by contact to the face of a thermoplastic film that is strippably laminated to a paper or like backing. The film is then positioned against a receiver with the toner image therebetween, and the composite is subjected to two successive stages of compressive heating. It is disclosed that the process produces high resolution images from very small particle size toner powder on rough paper.

An offset transfer process of electrographically produced toner images is disclosed in U.S. Pat. No. 5,108,865. In the disclosed process, a liquid toned image is generated on the surface of an electrographic element. The image is adhered to the adhesive surface of a temporary receptor sheet which comprises a carrier layer, releasable release layer, and a transferable adhesive layer secured to the release layer. The temporary receptor sheet with the image adhered thereto is removed from the electrographic element, and then the image surface of the temporary receptor sheet is contacted with a final receptor surface. The adhesive layer secures the toner image, adhesive layer and release layer to the final receiving layer and the carrier layer is removed from the release layer to generate the final image wherein the release layer now is a top protective layer.

A toner developed electrostatic imaging process for outdoor signs is disclosed in European Patent Publication No. 0437073 A2 (E.P. Application No. 90313976.4). This publication describes an electrographic imaging process (as contrasted to an electrophotographic process), in which electrostatic images are toned in sequence to form an intermediate image on a temporary dielectric receptor. The intermediate image is then transferred from the temporary dielectric receptor to a permanent receptor. In the disclosed process certain relative properties of the toner and the intermediate image, such as surface energy, Tg, work of adhesion, and complex dynamic viscosity, were identified as being important to the production of good final images.

Each of the electrographic processes disclosed in the patent publications discussed supra, employ a transfer of the toned image from an electrographic element to the final substrate using an intermediate transfer element. Although advances have been made in retaining the integrity of the toned image, such transfer steps remain prone to image degradation by abrasion or chemical interaction unless added laminating or coating steps are used. There continues to be a need for a simplified process to provide protected, distortion-free, full-color images, particularly, for use on large format posters, billboards and the like.

SUMMARY OF THE INVENTION

These needs are met by the electrographic imaging process of this invention which is a process for forming an electrographic image on a receptor substrate comprising the steps:

A) producing on the surface of an electrographic element a toned image layer to form an imaged electrographic element, wherein the electrographic element comprises in the order given;
   a) a carrier layer,
   b) a conductive layer,
   c) a dielectric layer, and
   d) a substantially tack-free, adhesive layer which is activated at a pressure and a temperature which is above ambient pressure and temperature of the electrographic element;
   wherein the toned image layer is adhered to the surface of the adhesive layer; and B) pressure laminating the receptor substrate to the toned image layer at the temperature which is above the ambient temperature, to form a laminated image element.

In an added embodiment of the process of this invention, the electrographic element further comprises a protective layer which is interposed between the carrier layer (a) and the conductive layer (b).

Another embodiment of this invention is a process for forming an electrographic image on a receptor substrate comprising the steps:

A) producing on the surface of an electrographic element a toned image layer to form an imaged electrographic element, wherein the electrographic element consists essentially of, in the order given;
a) a conductive carrier layer,
b) a dielectric layer, and
c) a substantially tack-free, adhesive layer which is activated at a pressure and a temperature which is above ambient pressure and temperature of the electrographic element;
wherein the toned image layer is adhered to the surface of the adhesive layer;
B) pressure laminating the receptor substrate to the toned image layer at the temperature which is above the ambient temperature, to form a laminated image element; and
C) removing the conductive carrier layer from the surface of the dielectric layer of the laminated image element.

A further embodiment of this invention is an electrographic element, wherein the electrographic element comprises;
a) a temporary carrier layer; and then, in either order,
b) a protective layer, and
c) a conductive layer; and then in the order given,
d) a dielectric layer; and
e) a substantially tack-free, adhesive layer which is activated at a pressure and a temperature which is above ambient pressure and temperature of the electrographic element.

BRIEF DESCRIPTION OF THE DRAWINGS

The invention can be more fully understood from the following description thereof in connection with the accompanying drawings described as follows.

DETAILED DESCRIPTION OF THE INVENTION

The present invention relates to a novel two step process for forming an electrographic image on a receptor substrate using a multilayer electrographic element. The electrographic element comprises, in the order given, a carrier layer, a conductive layer, a dielectric layer; and a substantially tack-free, adhesive layer which is activated at a pressure and a temperature which is above ambient pressure and temperature of the electrographic element. The novel electrographic imaging process comprises the steps: A) producing on the surface of the electrographic element a toned image layer, wherein the toned image layer is adhered to the surface of the adhesive layer to produce an imaged electrographic element and B) pressure laminating the receptor substrate to the toned image layer at the temperature which is above the ambient temperature, to form a laminated image element. When the carrier layer is transparent, it may remain adhered to the laminated image element to protect the toned image. Alternatively, the carrier layer may be stripped from the laminated image element. In this instance the conductive layer and/or the dielectric layer then also serves to protect the toned image. Thus in one instance the carrier layer is stripped from the conductive layer and in another instance the carrier layer along with the conductive layer is stripped from the dielectric layer. In an embodiment of this invention, the carrier layer itself is electrically conductive or semiconductive and this conductive carrier layer functions as both the carrier layer (a) as well as the conductive layer (b). In this instance the conductive carrier layer is stripped from the dielectric layer which then serves to protect the toned image. In an added embodiment of this invention, the electrographic element further comprises a protective layer which is interposed between the carrier layer and the conductive layer or between the conductive layer and the dielectric layer. In this embodiment the electrographic element comprises; a temporary carrier layer; and then, in either order, a protective layer, and a conductive layer; and then, in the order given, a dielectric layer; and a substantially tack-free, adhesive layer which is activated at a pressure and a temperature above ambient pressure and temperature of the electrographic element. Thus, one embodiment of the element of this invention is an electrographic element, wherein the electrographic element comprises in the order given;
a) a temporary carrier layer,
b) a protective layer,
c) a conductive layer,
d) a dielectric layer, and
e) a substantially tack-free, adhesive layer which is activated at a pressure and a temperature which is above ambient pressure and temperature of the electrographic element; and another embodiment of the element of this invention is an electrographic element, wherein the electrographic element comprises in the order given;
a) a temporary carrier layer,
c) a conductive layer,
b) a protective layer,
d) a dielectric layer, and
e) a substantially tack-free, adhesive layer which is activated at a pressure and a temperature which is above ambient pressure and temperature of the electrographic element. When the electrographic element containing the protective layer is used in the process of this invention, a third process step (C) is added in which the temporary carrier layer, or the temporary carrier layer along with the conductive layer, is removed from the protective layer of the laminated image element formed in step (B).

Figure 1A:
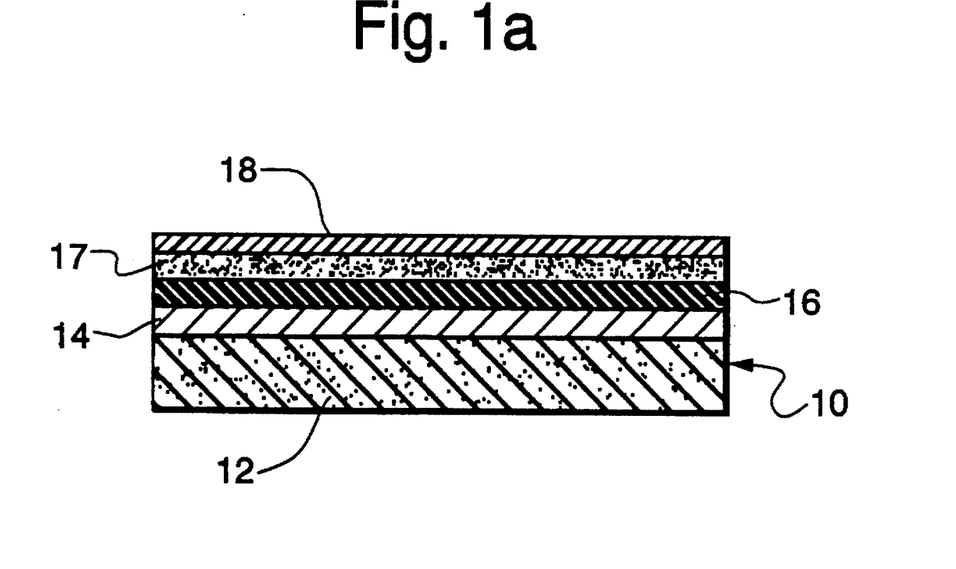
FIGS. 1a, 1b, 1c and 1d are cross section views illustrating details of the imaged electrographic elements used in the process of this invention.

The electrographic process of this invention will now be described by reference to the accompanying drawings. Throughout the following description, similar reference characters refer to similar elements in all figures of the drawings. Referring to FIG. 1a, an imaged electrographic element (10) comprises a carrier layer (12), a conductive layer (14), a dielectric layer (16), an adhesive layer (17), and a toned image layer (18).

The carrier layer (12) functions as a support to the superposed layers during the process steps of this invention and may be any web or sheet material possessing suitable flexibility, dimensional stability and adherence properties to the conductive layer (14). Typically, the web or sheet material is a flexible polymeric film, e.g., such as polyethylene terephthalate film and the like, or a foraminous material, e.g., such as a paper sheet and the like. The web or sheet material may be electrically conductive or semiconductive, e.g., such as metal foils, metalized polyethylene terephthalate films, conductive paper sheeting and the like. In this instance the carrier layer (12) is a conductive carrier layer. The web or sheet may also be surface treated or coated with a material to enhance desired surface characteristics.

The conductive layer (14) of this invention comprises a film-forming, organic material, e.g., such as a cation type styrene-methacrylate copolymer having an electrical resistivity of about 1 to 30 meg-ohm per ☐. Suitable film-forming, organic materials include polymeric quaternary ammonium compounds, polystyrene sulfonic acid, polymeric matrices capable of ionizing inorganic electrolytes contained therein, and the like. The film-forming, organic material may be used alone or with conductive, inorganic materials and/or metals dispersed therein, e.g., such as tin oxide, aluminum and the like. When a conductive carrier layer is employed without an added conductive layer, the conductive carrier layer typically will have an electrical resistivity of about 1 to 30 meg-ohm per ☐.

The dielectric layer (16) which is adhered to the conductive layer (14), may be any conventional film-forming material having a dielectric constant of about 2 to about 5. This layer typically has a thickness in the range of about 1 μm to about 20 μm and preferably in the range of about 5 μm to about 15 μm. This layer typically comprises one or more polymers selected from polyvinylacetate, polyvinylchloride, polyvinylbutyral, polymethylmethacrylate, styrenated acrylics, styrene acrylonitrile, and the like. Other ingredients may be chosen from waxes, polyethylene, alkyd resins, nitrocellulose, ethylcellulose, cellulose acetate, shellac, epoxy resins, styrene-butadiene copolymers, clorinated rubbers, polyacrylates, and the like. The property requirements of the dielectric layer (16) are well known in the art as disclosed, for example, in U.S. Pat. Nos. 3,920,880 and 4,201,701.

The adhesive layer (17) functions to permanently adhere the imaged electrographic element (10), including the superposed toned image layer (18), to the receptor substrate during the process of this invention. The adhesive layer (17) may also function as a component of the dielectric layer (16) described supra. When a sole layer has such dual functions, it is considered a composite of both the adhesive layer (17) and the dielectric layer (16). The adhesive layer (17) is a substantially tack-free, thermal adhesive which is activated at a pressure and a temperature that is above the normal ambient pressure and temperature of the electrographic element prior to use. The adhesive layer (17) may be chosen from a variety of conventional thermal adhesive materials. Typically, the thermally activated adhesive material is comprised of thermoplastic polyurethanes; polycaprolactone; acrylic copolymers; and combinations thereof. Representative thermally activated adhesive materials include Morthane® CA-116 urethane resin (a product of Morton International); Tone® Polymer P767E biodegradable plastic resin (a product of Union Carbide); Elvax® 240 vinyl resin (a product of Dupont Chemicals); and the like. The adhesive layer (17) is visually transparent in at least one region within the visible spectral region and typically is transparent throughout the visible spectral region. This layer may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2,2,6,6-tetramethyl-4-piperidinyl) sebacate and the like; and combinations thereof. The surface of the adhesive layer (17) may be rough to ensure good transfer of charge during passage of the element under the stylus bar during imaging. This roughness can be obtained by including in the layer particles sufficiently large to give surface irregularities to the layer. Particles of diameter in the range of about 1 μm to about 15 μm are suitable. Particle composition and size are chosen to give the required dielectric constant to the layer as well as the appropriate surface topography and abrasive properties to the layer.

The toned image layer (18) is produced in the first step (not shown in the accompanying drawings) of the process of this invention. Any conventional electrostatic process may be used to form the toned image layer (18) on the surface of the adhesive layer (17), e.g., such as those processes (and required apparatus) which are disclosed in U.S. Pat. Nos. 4,007,489; 4,731,542; and 4,569,584, and in European Patent Publication No. 0437073 A2 (E.P. Application No. 90313976.4) discussed supra. In such processes, an electrostatic latent image is produced directly by imagewise depositing charge onto an accepting dielectric (adhesive) surface. Typically, styli are used to create these charge patterns and are arranged in linear arrays across the width of the moving dielectric (adhesive) surface.

Figure 1B:
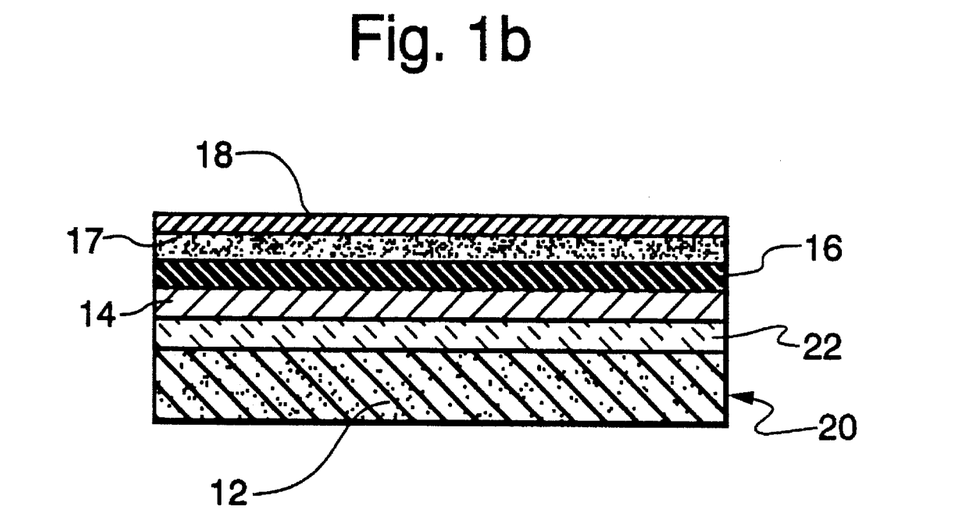
Figure 1C:
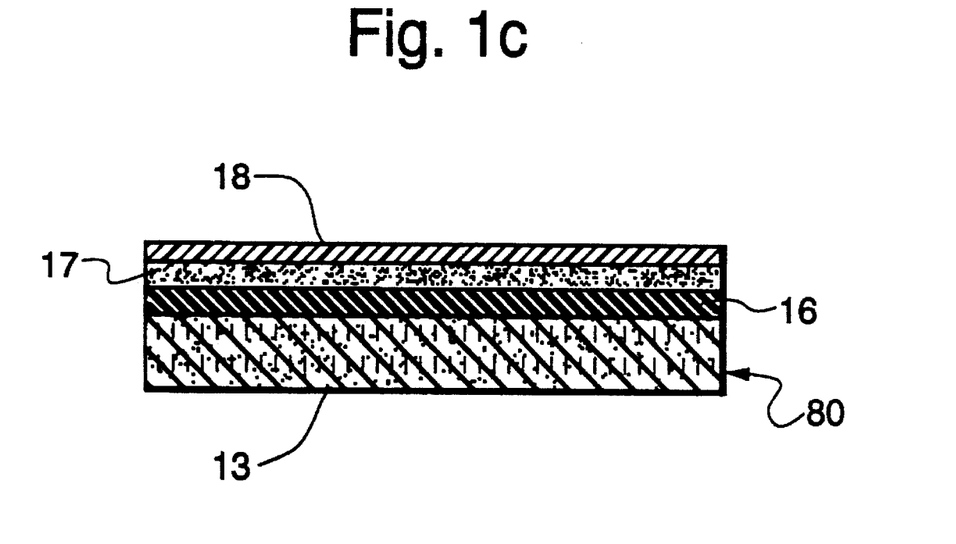

In one embodiment of this invention, an electrographic element is used containing a conductive carrier layer as the sole conductive layer. Referring to FIG. 1c, an imaged electrographic element (80) comprises a conductive carrier layer (13), a dielectric layer (16), an adhesive layer (17), and a toned image layer (18).

The conductive carrier layer (13) functions both as a support to the superposed layers as well as a conductive layer during the process steps of this invention. The conductive carrier layer (13) may be any web or sheet material possessing suitable flexibility, dimensional stability, electrical conductivity and adherence properties to the dielectric layer (16). Typically, the conductive web or sheet material is a flexible foil or film, e..g., such as a metal foil, metalized polyethylene terephthalate film, and the like, or a foraminous material, e.g., such as conductive paper sheeting and the like. The conductive carrier layer (13) typically will have an electrical resistivity of about 1 to 30 meg-ohm per ☐. Except for the conductive carrier layer (13) and the absence of a separate conductive lager,.the character and function of each layer is substantially as described by reference to FIG. 1a, supra.

The electrographic element of this invention comprises, in the order given, a temporary carrier layer, a protective layer, a conductive layer, a dielectric layer, and a substantially tack-free, adhesive layer which is activated at a pressure and a temperature which is above ambient pressure and temperature of the electrographic element. Referring to FIG. 1b, an imaged electrographic element having an interposed protective layer (20) comprises a temporary carrier layer (12), a protective layer (22), a conductive layer (14), a dielectric layer (16), an adhesive layer (17), and a toned image layer (18). Except for the temporary carrier layer (12) and the protective layer (22), the character and function of each layer is substantially as described by reference to FIG. 1a, supra.

The protective layer (22) is a polymeric film material which is resistant to scratching, abrasions and the like, and to environmental components and contaminants. The protective layer (22) is permanently adhered to the conductive layer (14) while being only temporarily adhered to the temporary carrier layer. The protective layer (22) is visually transparent in at least one region within the visible spectral region and typically is transparent throughout the visible spectral region. Polymeric materials which are useful in making this layer include polyvinyl chloride; polyvinyl butyral; cellulose acetate proprionate; cellulose acetate butyrate; polyesters; acrylics; polyurethanes; styrene copolymers, e.g., such as styrene acrylonitrile; and combinations thereof. This layer may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2, 2,6,6-tetramethyl-4-piperidinyl) sebacate and the like; and combinations thereof. The protective layer may be provided with a matt surface. This matt surface can be obtained by including in the layer particles sufficiently large to give surface irregularities to the layer. Particles of average diameter in the range of about 1 μm to about 15 μm are suitable. This layer typically has a thickness in the range of about 0.5 μm to about 10 μm and preferably in the range of about 1 μm to about 4 μm. Such layers typically will withstand scribing with the point of a 4H pencil without breakthrough.

The temporary carrier layer (12) functions as a temporary support to the superposed layers during the process steps of this invention and may be any web or sheet material possessing suitable flexibility, dimensional stability and adherence properties to the protective layer (22). Typically, the web or sheet material is a flexible polymeric film or a foraminous material as described supra by reference to FIG. 1a. The web or sheet may also be surface treated or coated with a material to enhance desired release characteristics, e.g., such as treatment with a silicone release agent and the like.

Figure 1D:
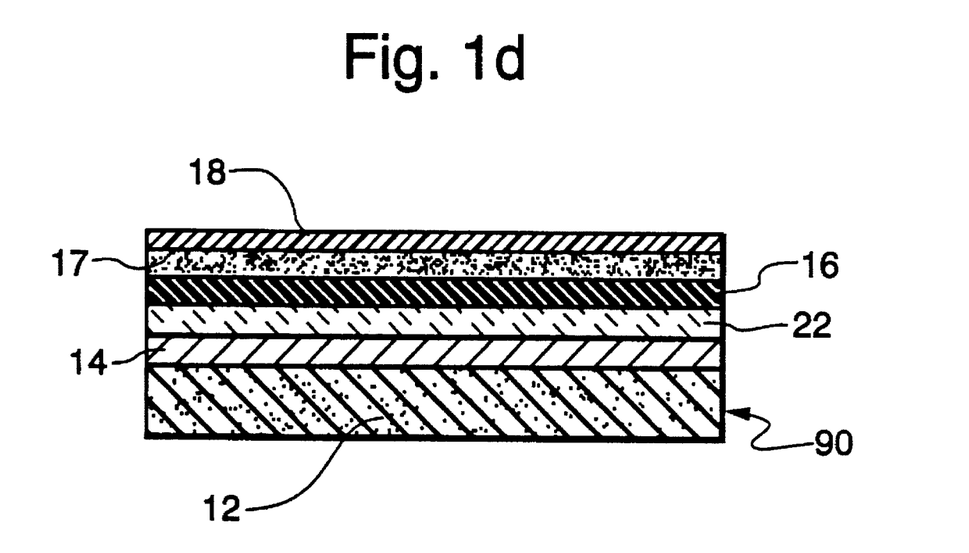

The alternate electrographic element of this invention comprises, in the order given, a temporary carrier layer, a conductive layer, a protective layer, a dielectric layer, and a substantially tack-free, adhesive layer which is activated at a pressure and a temperature which is above ambient pressure and temperature of the electrographic element. Referring to FIG. 1d, an imaged electrographic element having an interposed protective layer (90) comprises a temporary carrier layer (12), a conductive layer (14), a protective layer (22), a dielectric layer (16), an adhesive layer (17), and a toned image layer (18). Except for the location of the protective layer (22) and the change of the adhesive relationships resulting therefrom, the character and function of each layer is substantially as described by reference to FIGS. 1a and 1b, supra. In this embodiment the protective layer (22) is permanently adhered to the dielectric layer (16) and, typically, the adhesion between the temporary carrier layer (12) and the conductive layer (14) is greater than the adhesion between the conductive layer (14) and the protective layer (22). In this instance, the contiguous surface of either the conductive layer (14) or the protective layer (22), or both layers, may possess, or be surface treated to possess, suitable release characteristics to insure separation at the interface of the conductive (14) and protective (22) layers. Typically, the conductive layer (14) is firmly adhered to the temporary carrier layer (12).

Figure 2A:
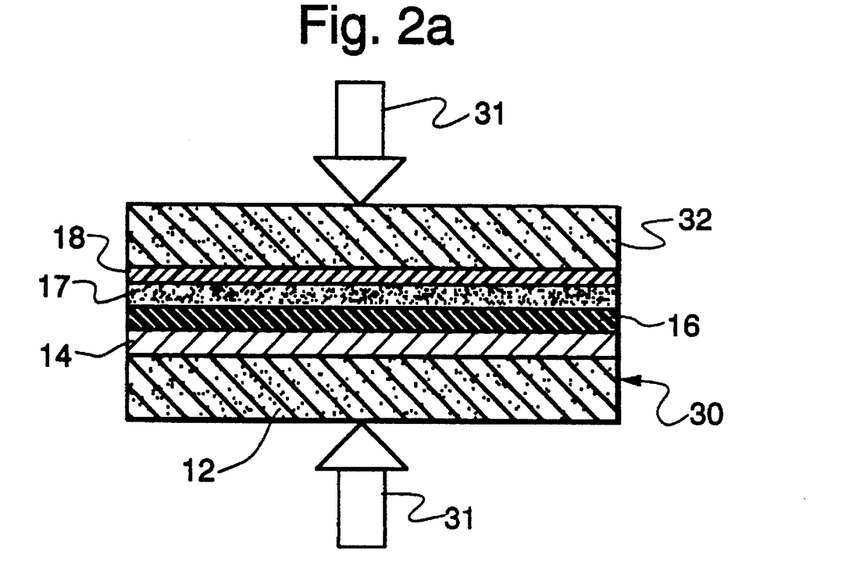
FIGS. 2a, 2b and 2c are cross section views illustrating subsequent process steps of this invention.

The electrographic imaging process of this invention comprises five process steps of which the initial process step (A) of producing an imaged electrographic element (10) has been described supra by reference to FIG. 1. The remaining steps of the process may be described by reference to FIGS. 1 and 2.

The second process step (B) comprises pressure laminating a receptor substrate to the surface of the toned image layer (18) of the imaged electrographic element (10) at a temperature which is above the ambient temperature. Referring to FIG. 2a, the receptor substrate (32) is contacted and pressure laminated to the toned image layer (18) using an applied pressure (31) to the surfaces of the carrier layer (12) and receptor substrate (32) to form a competed imaged electrographic element (30). In this embodiment, the carrier layer (12) remains adhered to the conductive layer (14) and serves to protect the imaged electrographic element (30) from scratching, abrasions, environmental components and contaminants, and the like.

The receptor substrate (32) typically functions as the final support for the imaged electrographic element (30) formed during the process steps of this invention. The receptor substrate (32) may be any surface upon which an electrographic image is desired. Typically, it is a web or sheet material possessing dimensional stability and adherence properties to the toned image layer (18) of the imaged electrographic element (10). The web or sheet material may be a flexible polymeric film, e,g., such as polyethylene terephthalate film and the like; a foraminous material, e.g., such as a paper sheet, textile fabrics, and the like; metal films or webs, e.g., such as aluminum, steel, tin-plate, and the like; or any composites or laminates thereof. The receptor substrate (32) may be a rigid or semi-rigid sheeting or plate, e.g., such as sheeting or plates of metal, glass, ceramic, plastic, cardboard, or any composites or laminates thereof. The receptor substrate (32) may vary in size from that of a photographic print, e.g., having an area of about 30 cm$^2$ or less, to that of billboards, e.g., having an area of about 70 m$^2$ or greater. The web or sheet may also be surface treated or coated with a material to enhance desired surface characteristics.

The receptor substrate (32) typically is pressure laminated to the toned image surface of the imaged electrographic element (10) under an applied pressure (31) of about atmospheric pressure or greater but may range from about 0.5 kg/cm$^2$ (7 p.s.i.) to about 100 kg/cm$^2$ (1422 p.s.i.) or more. The term "applied pressure" is intended to mean the absolute pressure which is applied to a unit area of the surface as conventionally derived from the geometry of the pressure means, e.g., the geometry of the laminating nip, in combination with a measurement means, e.g., a calibrated gauge pressure. Suitable means that may be used to apply pressure include platen presses; counterpoised, double roll, laminating devices; scanning, single roll, laminating devices; vacuum laminating devices; and the like. When the receptor substrate (32) has an air impervious surface, roll laminating devices are preferred since they readily minimize air entrapment between the toned image layer (18) and the receptor substrate (32) during the pressure laminating process step. Vacuum may be applied with such devices to further eliminate air entrapment. When the receptor substrate (32) is rigid and roll laminating devices are used, the flexible imaged electrographic element (10) typically is pressure laminated to the receptor substrate (32). Heat is used in the pressure laminating step (B) of this invention to raise the temperature of the adhesive layer (17) from its normal ambient temperature (e.g., room temperature) where it is substantially tack-free, to a temperature at which the adhesive is activated. Heat may be applied to the adhesive layer (17) prior to and/or concurrently with the application of the applied pressure (31). Thus, the receptor substrate (32) and/or the imaged electrographic element (10) may be heated prior to pressure lamination by radiant or contact heaters and then laminated while hot. Alternatively the pressure means itself may also function as a heater, e.g., such as a hot roll laminator, or both prior and concurrent heating may be used in combination. The laminating temperature typically is within ±5° C. of the activation temperature of the adhesive layer (17), and preferably, a laminating temperature of about 100° C. or greater is employed. Typically, temperature is measured on the surface of the heated roll or platen by means of temperature sensitive tape. Using the process of this invention, surprisingly strong adhesion of the toned electrographic element (10) to the receptor substrate (32) is achieved with substantially no image distortion, even though the toned image layer (18) is interposed between the adhesive layer (17) and the receptor substrate (32).

Figure 2B:
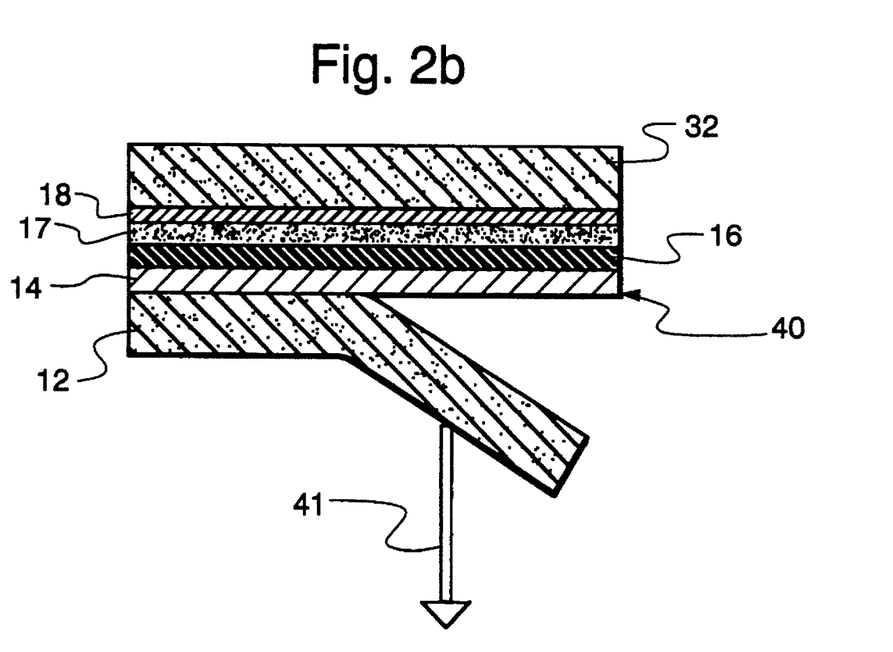

In an added embodiment of this invention, a third process step (C) comprises removing the carrier layer (12) from the surface of the conductive layer (14) of the imaged electrographic element (30). In this embodiment, the remaining conductive layer (14) functions as a protective layer. Referring to FIG. 2b, the carrier layer (12) is peeled, using a peel force (41), from the surface of the conductive layer (14) to form an imaged electrographic element (40). Typically, the carrier layer (12) is peeled with a peel force (41) directed at an angle of 90° or more from the surface of the conductive layer (14). The peel rate and the peel force (41) are not critical and preferred values will depend on the nature of the conductive and carrier materials. The temperature at which the carrier layer (12) is peeled form the conductive layer (14) will depend on the nature of the adhesive, conductive and carrier materials used in the imaged electrographic element (30). Surprisingly it has been found that the carrier layer (12) can be removed immediately after formation of the imaged electrographic element (30) (i.e., while still in a heated state from the application process step (B)) without delamination of the thermal adhesive layer (17) or any of the other component layers. Moreover, there is substantially no conductive material removed with the carrier layer (12) in this instance. In this context, the term "immediately" is intended to mean a time span of about 1 minute or less and preferably between about 1 second and about 20 seconds. Alternatively, the formed imaged electrographic element (30) may be cooled and stored before removal of the carrier layer (12). In this instance, the carrier layer (12) can be removed at room temperature from the imaged electrographic element (30) without delamination of the adhesive layer (17) or any of the other component layers and with substantially no removal of conductive material with the first carrier layer (12). Alternatively, the imaged electrographic element (30) may be reheated prior to removal of the carrier layer (12). In this instance, the element typically is reheated to a temperature which is within about ±5° C. of the temperature used to form the element in process step (B).

Figure 2C:
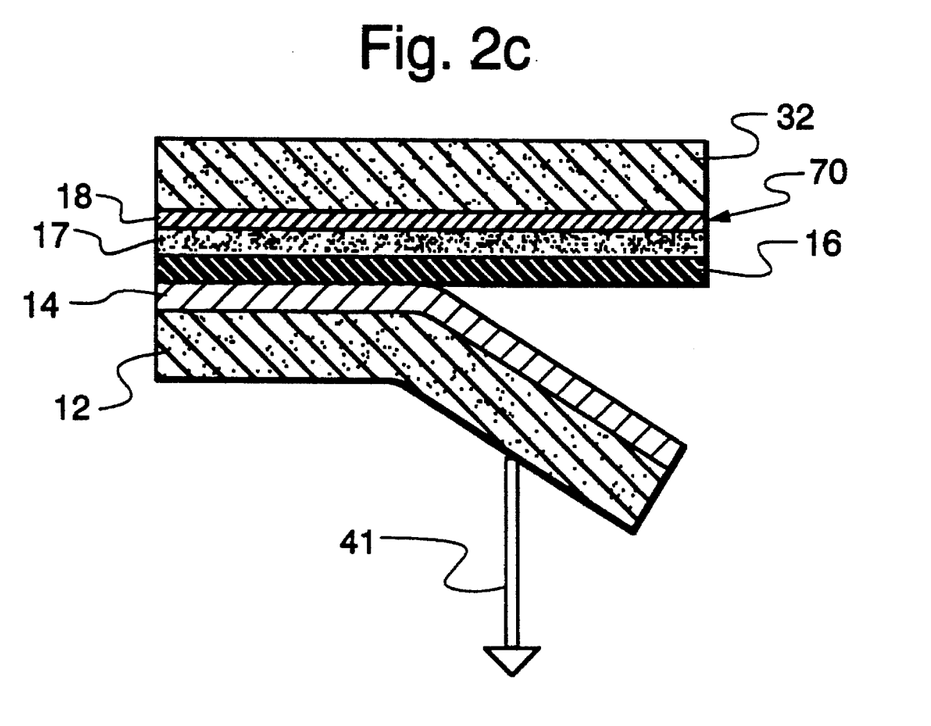

In an alternate embodiment of this process, a third process step (C) comprises removing the carrier layer (12) along with the conductive layer (14) from the surface of the dielectric layer (16) of the imaged electrographic element (30). In this embodiment, the remaining dielectric layer (16) functions as a protective layer. Referring to FIG. 2c, the carrier layer (12) along with the conductive layer (14) is peeled, using a peel force (41), from the surface of the dielectric layer (16) to form an imaged electrographic element (70). Typically, the carrier layer (12) and conductive layer (14) is peeled with a peel force (41) directed at an angle of 90° or more from the surface of the dielectric layer (16). The peel rate and the peel force (41) are not critical and preferred values will depend on the nature of the dielectric, conductive and carrier materials. The temperature at which the layers are peeled from the dielectric layer (16) will depend on the nature of the materials used in the imaged electrographic element (30). Surprisingly has been found that the carrier (12) and conductive (14) layers can be removed immediately after formation of the imaged electrographic element (30) (i.e., while still in a heated state from the application process step (B)) without delamination at the thermal adhesive layer (17). In this context, the term "immediately" is intended to mean a time span of about 1 minute or less and preferably between about 1 second and about 20 seconds. Alternatively, the formed imaged electrographic element (30) may be cooled and stored before removal of the carrier (12) and conductive (14) layers. In this instance, the carrier (12) and conductive (14) layers can be removed at room temperature from the imaged electrographic element (30) without delamination of the adhesive layer (17). Alternatively, the imaged electrographic element (30) may be reheated prior to removal of the carrier (12) and conductive (14) layers. In this instance, the element typically is reheated to a temperature which is within about ±5° C. of the temperature used to form the element in process step (B). In a preferred embodiment of this process, the carrier layer (12) is a conductive carrier layer which is electrically conductive or semi-conductive, e.g., a sheet of conductivized paper. In this instance, both the conductive carrier layer (12) and the conductive layer (14) may be removed from the dielectric layer (16) of the electrographic element (30).

Figure 4A:
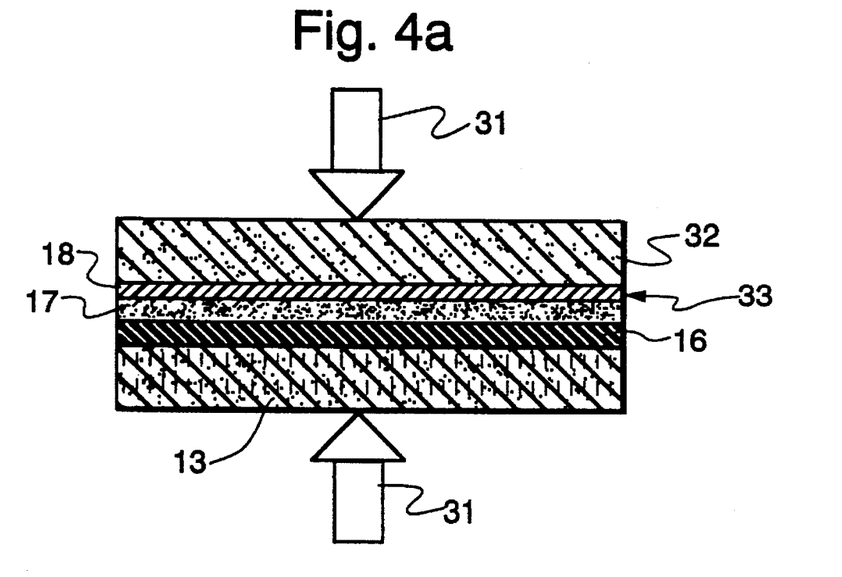
FIGS. 4a and 4b are cross section views illustrating the process using the electrographic element of this invention which contains a conductive carrier layer as the sole conductive layer.
Figure 4B:
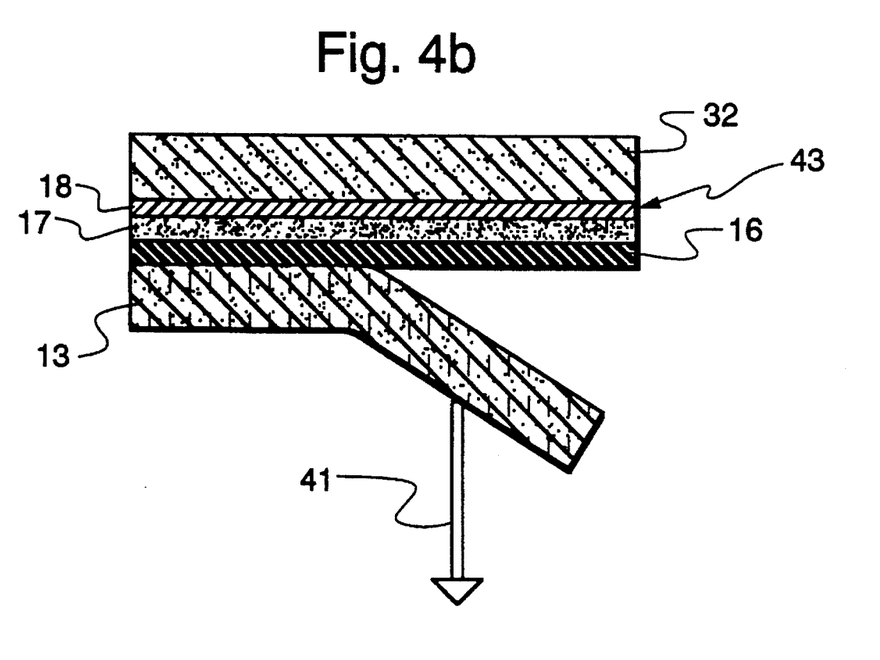

In the instance when a conductive carrier layer is the sole conductive layer, the electrographic imaging process of this invention comprises five process steps of which the initial process step (A) of producing an imaged electrographic element (80) has been described supra by reference to FIG. 1c. The remaining steps of the process may be described by reference to FIGS. 1c and 4.

The second process step (B) comprises pressure laminating a receptor substrate to the surface of the toned image layer (18) of the imaged electrographic element (80) at a temperature which is above the ambient temperature. Referring to FIG. 4a, the receptor substrate (32) is contacted and pressure laminated to the toned image layer (18) using an applied pressure (31) to the surfaces of the conductive carrier layer (13) and receptor substrate (32) to form an imaged electrographic element (33). The nature and function of the receptor substrate as well as the pressure laminating conditions of this process step are substantially as described with reference to FIG. 2, supra.

The third process step (C) comprises removing the conductive carrier layer (13) from the surface of the dielectric layer (16) of the imaged electrographic element (33). In this embodiment, the remaining dielectric layer (16) functions as a protective layer. Referring to FIG. 4b, the conductive carrier layer (13) is peeled, using a peel force (41), from the surface of the dielectric layer (16) to form an imaged electrographic element (43). Typically, the conductive carrier layer (13) is peeled with a peel force (41) directed at an angle of 90° or more from the surface of the dielectric layer (16). The peel rate and the peel force (41) are not critical and preferred values will depend on the nature of the dielectric and conductive carrier materials. The temperature at which the layers are peeled from the dielectric layer (16) will depend on the nature of the materials used in the imaged electrographic element (33). Surprisingly has been found that the conductive carrier layer (12) can be removed immediately after formation of the imaged electrographic element (33) (i.e., while still in a heated state from the application process step (B)) without delamination at the thermal adhesive layer (17). In this context, the term "immediately" is intended to mean a time span of about 1 minute or less and preferably between about 1 second and about 20 seconds. Alternatively, the formed imaged electrographic element (33) may be cooled and stored before removal of the conductive carrier (13). In this instance, the conductive carrier layer (13) can be removed at room temperature from the imaged electrographic element (33) without delamination of the adhesive layer (17). Alternatively, the imaged electrographic element (33) may be reheated prior to removal of the conductive carrier layer (13). In this instance, the element typically is reheated to a temperature which is within about ±5° C. of the temperature used to form the element in process step (B).

Figure 3A:
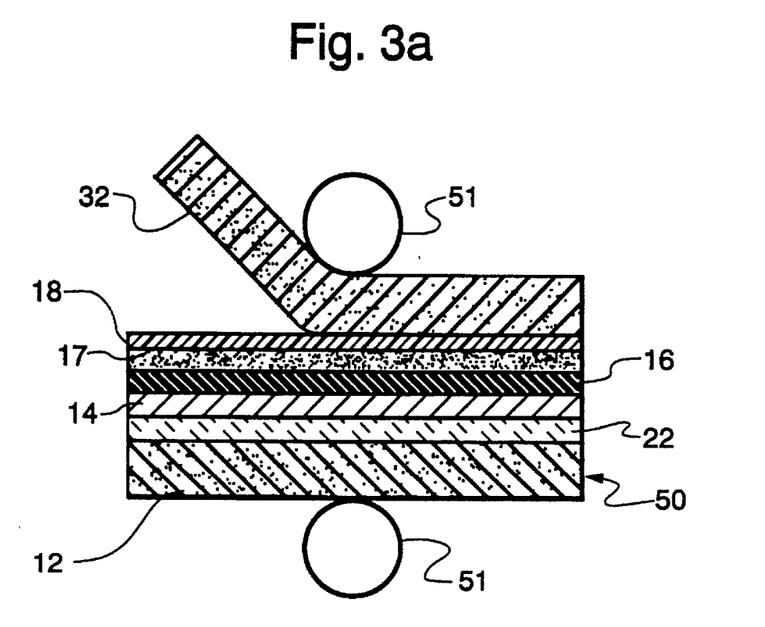
FIGS. 3a and 3b are cross section views illustrating the process using the electrographic element of this invention which contains a protective layer permanently adhered to the conductive layer.
Figure 3B:
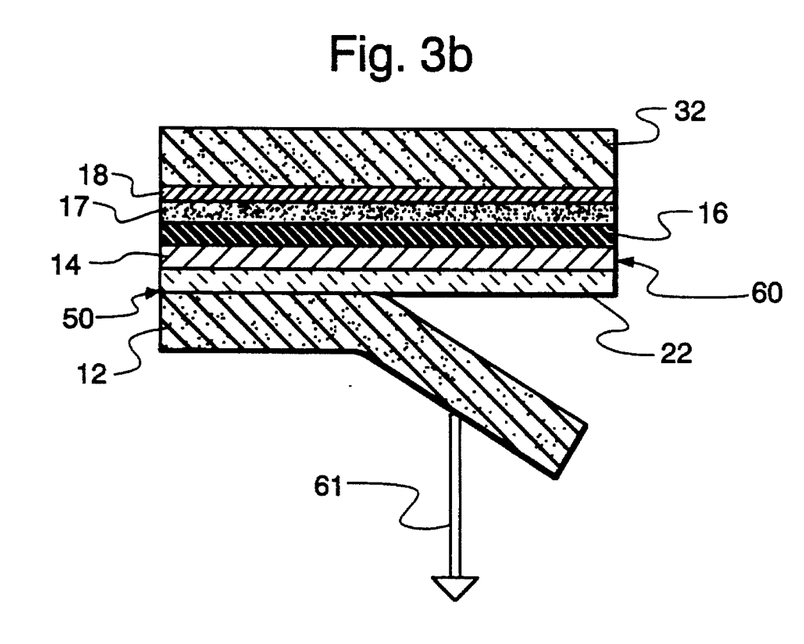

The embodiment of the electrographic imaging process of this invention which uses an electrographic element containing a protective layer (22), interposed between a temporary carrier layer (12) and a conductive layer, comprises three process steps of which the initial process step (A) of producing an imaged electrographic element (20) has been described supra by reference to FIG. 1b. The remaining steps of the process may be described by reference to FIGS. 1 and 3.

The second process step (B) comprises pressure laminating a receptor substrate to the surface of the toned image layer (18) of the imaged electrographic element (20) at a temperature which is above the ambient temperature. Referring to FIG. 3a, an imaged electrographic element (20) and a receptor substrate (32) are introduced into the nip of a pair of pressure laminating rolls (51) so that the receptor substrate (32) is in surface-to-surface contact with the toned image layer (18). In this embodiment, the adhesive layer is heated either prior to entry of the elements into the nip (not shown in the figure) or by means of at least one heated pressure roll (51), which generally is in surface contact with the temporary carrier layer (12) of the imaged electrographic element (20). Alternatively, both pressure rolls (51) may be heated and the imaged electrographic element (20) may be preheated. Typically, the elements are fed through the pressure laminating rolls (51) at a substantially constant rate to insure uniform heating and adhesion along the length of the imaged electrographic element (20) to form an intermediate imaged element (50). The temporary carrier layer (12) may be removed at any time after the formation of the intermediate imaged element (50) and may be left adhered for extra protection during storage and handling.

The third process step (C) comprises removing the temporary carrier layer (12) from the surface of the protective layer (22) of the intermediate imaged element (50) to form the completed electrographic image (60). Referring to FIG. 3b, the temporary carrier layer (12) is peeled, using a peel force (61), from the surface of the protective layer (22) to form the completed electrographic image (60). Typically, the temporary carrier layer (12) is peeled at room temperature with a peel force (61) directed at an angle of 90° or more from the surface of the protective layer (22). The peel rate and the peel force (61) are not critical and preferred values will depend on the nature of the protective and carrier materials. While the temporary carrier layer (12) typically is removed at room temperature, the intermediate image element (50) may be heated to facilitate removal.

Figure 5A:
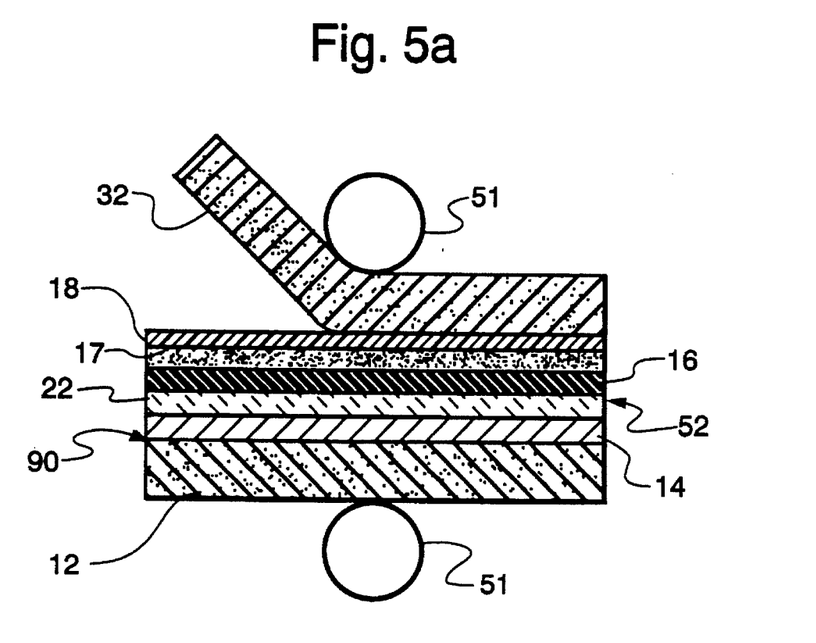
FIGS. 5a and 5b are cross section views illustrating the process using the electrographic element of this invention which contains a protective layer permanently adhered to the dielectric layer.
Figure 5B:
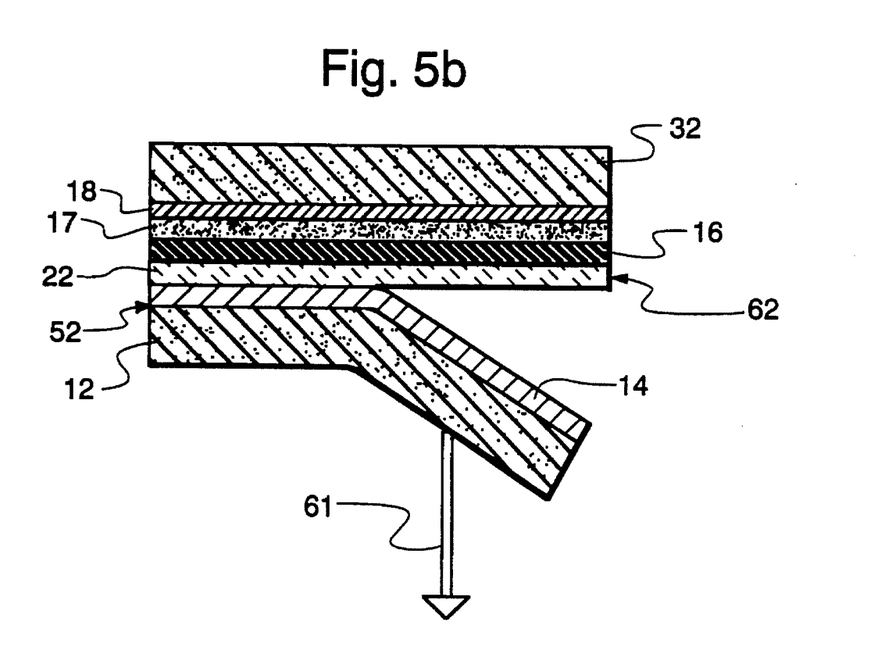

The embodiment of the electrographic imaging process of this invention which uses an electrographic element containing a protective layer (22), interposed between a conductive layer (14) and a dielectric layer (16), comprises three process steps of which the initial process step (A) of producing an imaged electrographic element (90) has been described supra by reference to FIG. 1d. The remaining steps of the process may be described by reference to FIGS. 1 and 5.

The second process step (B) comprises pressure laminating a receptor substrate to the surface of the toned image layer (18) of the imaged electrographic element (90) at a temperature which is above the ambient temperature. Referring to FIG. 5a, an imaged electrographic element (90) and a receptor substrate (32) are introduced into the nip of a pair of pressure laminating rolls (51) so that the receptor substrate (32) is in surface-to-surface contact with the toned image layer (18). In this embodiment, the adhesive layer is heated either prior to entry of the elements into the nip (not shown in the figure) or by means of at least one heated pressure roll (51), which generally is in surface contact with the temporary carrier layer (12) of the imaged electrographic element (90). Alternatively, both pressure rolls (51) may be heated and the imaged electrographic element (90) may be preheated. Typically, the elements are fed through the pressure laminating rolls (51) at a substantially constant rate to insure uniform heating and adhesion along the length of the imaged electrographic element (90) to form an intermediate imaged element (52). The temporary carrier layer (12) may be removed at any time after the formation of the intermediate imaged element (52) and may be left adhered for extra protection during storage and handling.

The third process step (C) comprises removing the temporary carrier layer (12) along with the the conductive layer (14) from the surface of the protective layer (22) of the intermediate imaged element (52) to form the completed electrographic image (62). Referring to FIG. 5b, the temporary carrier layer (12) along with the conductive layer (14) adhered thereto is peeled, using a peel force (61), from the surface of the protective layer (22) to form the completed electrographic image (62). Typically, the temporary carrier (12) and conductive (14) layers are peeled at room temperature with a peel force (61) directed at an angle of 90° or more from the surface of the protective layer (22). The peel rate and the peel force (61) are not critical and preferred values will depend on the nature of the protective and carrier materials. While the temporary carrier (12) and conductive (14) layers typically are removed at room temperature, the intermediate image element (52) may be heated to facilitate removal.

In the practice of the process of this invention where the carrier layer is to be removed, it is preferred to keep the carrier layer in place on the imaged electrographic element throughout storage and processing in order to prevent any damage or marring to the underlying layers. In this instance, removal of the carrier layer is the very last step in preparing and mounting the protected electrographic image.

The electrographic process of this invention will now be illustrated by the following examples but is not intended to be limited thereby.

EXAMPLE 1

An electrographic element was prepared as follows: A conductive coating solution was prepared from the following ingredients:

| Ingredient | Parts By Weight |
| --- | --- |
| Methyl alcohol | 80.0 |

-continued

| Ingredient | Parts By Weight |
| --- | --- |
| Deionized water | 12.0 |
| Chemistat ® 6300H[1] | 8.0 |

[1] - Chemistat ® 6300H electroconductive polymer is a product of Sanyo Chemical Industries and is a cation type styrene-methacrylate copolymer in aqueous solution.

The above ingredients were added in the order shown and mixed in a Lightnin® mixer for 5 minutes. The coating was then applied to a 0.001 inch (~127 µm) thick, untreated, polyethylene terephthalate film with a meyer rod and dried in an air dried oven at 240° F. (~115° C.) for two minutes to give a dry coating thickness of 2.0 µm.

A dielectric layer coating solution was prepared from the following ingredients.

| Ingredient | Parts By Weight |
| --- | --- |
| Propylene glycol monomethyl ether | 7.32 |
| Toluene | 21.96 |
| Acrylic resin[2] | 56.44 |
| Amorphous silica slurry (ave. particle size 9 µm) | 12.58 |
| Calcined clay[3] (ave. particle size 0.8 µm) | 1.70 |

[2] -Acrylic resin E-342 is a product of Rohm + Hass of PA. a solvent based modified acrylic copolymer.
[3] - Calcined clay is Translink ® 77 calcined clay, a product of Englehard Corporation.

The above ingredients were added as shown and mixed using a Cowles dispersion mixer for 10 minutes. The solution was overcoated onto the previously coated film using a meyer rod and dried at 240° F. (~115° C.) for two minutes to give a dry coating thickness of 5.0 µm.

An adhesive layer coating solution was prepared from the following ingredients.

| Ingredient | Parts By Weight |
| --- | --- |
| Methyl ethyl ketone | 77.96 |
| Toluene | 10.00 |
| Morthane ® CA-116 urethane resin[4] | 12.00 |
| Amorphous silica (ave. particle size 3 µm) | 0.04 |

[4] - Morthane ® CA-116 urethane resin is a product of Morton-Thiokol and is a hydroxyl terminated polyurethane elastomer.

The coating solution was made by mixing the methyl ethyl ketone, toluene and urethane resin for 30 minutes with a high speed Lightnin® mixer. Amorphous silica was then added and mixed for 5 minutes. The solution was overcoated onto the previously coated film using a meyer rod and dried at 240° F. (~115° C.) for two minutes to give a dry coating thickness of 2.0 µm to form the electrographic element.

The imaged layer was applied to adhesive surface of the electrographic element formed above, by using a Versatec® V-80 electrostatic plotter operated at conventional plotting conditions.

The laminating step was performed by first laying the imaged electrographic element on a sheet of 20# xerographic bond paper so that the imaged layer contacted the paper sheet. This composite was then passed through the hot nip of a hot roll laminator at a speed of 2.54 cm per second and at a pressure of 30 kg/cm². The hot nip consisted of a heated steel roll at a temperature of 240° F. (~115° C.) and a hard polyurethane backing roll of a B. F. Perkins laboratory calender. The laminated composite exiting the hot nip was allowed to cool to room temperature and the polyethylene terephthalate film was left in place, adhered to the conductive coating, where it functioned as a protective coversheet for the finished electrographic element.

EXAMPLE 2

The process of Example 1 was repeated except that the laminating step was performed by first laying the imaged electrographic element on a 0.004 inch (~100 µm) thick white vinyl film sheet so that the imaged layer contacted the vinyl sheet. This composite sample was then passed through the hot nip of the B. F. Perkins laboratory calender at a speed of 2.54 cm per second, at a pressure of 30 kg/cm² and at a temperature of 240° F. (~115° C.). Within 10 seconds of the exit of the laminated composite from the hot nip, the polyethylene terephthalate support contiguous to the conductive layer was stripped therefrom. In this instance the conductive layer functioned as protection fop the electrographic image.

EXAMPLE 3

An electrographic element containing an interposed protective layer was made as follows: An abrasion resistant coating solution was prepared from the following ingredients.

| Ingredient | Parts By Weight |
| --- | --- |
| Propylene monomethyl ether | 30.41 |
| Ethyl acetate | 26.41 |
| Toluene | 10.96 |
| Butyrolactone | 9.26 |
| Cellulose acetate propionate[5] | 20.06 |
| Hexamethoxymethylmelamine[6] | 2.64 |
| Para-toluene sulfonic acid | 0.53 |
| Amorphous silica (ave. particle size 3 µm) | 0.01 |

[5] - Cellulose acetate propionate is C.A.P. 504-0.2 cellulose ester, a product of Eastman Chemicals.
[6] - Hexamethoxymethylmelamine is Cymel ® 301 melamine-formaldehyde crosslinking resin, a product of Cyanamid Corporation.

The cellulose acetate propionate was added to the solvent blend slowly under a high speed Lightnin® mixer. When fully dissolved, the amorphous silica was then added and mixed for five minutes. The melamine resin and acid catalyst were added and mixed for an additional 15 minutes. The resulting lacquer was then coated on a 25.4 µm (0.001 inch) thick, untreated, polyethylene terephthalate film using a meyer rod and dried at 240° F. (~115° C.) for two minutes to give a dry coating thickness of 2.5 µm.

A conductive coating solution was prepared from the following ingredients:

| Ingredient | Parts By Weight |
| --- | --- |
| Methyl alcohol | 80.0 |
| Deionized water | 12.0 |
| Chemistat ® 6300H[1] | 8.0 |

The above ingredients were added in the order shown and mixed in a Lightnin® mixer for 5 minutes. The coating was then applied to the surface of the protective coating with a meyer rod and dried in an air dried oven at 240° F. (~115° C.) for two minutes to give a dry coating thickness of 2.0 µm.

A dielectric layer coating solution was prepared from the following ingredients.

| Ingredient | Parts By Weight |
| --- | --- |
| Propylene glycol monomethyl ether | 7.32 |
| Toluene | 21.96 |
| Acrylic resin[2] | 56.44 |
| Amorphous silica slurry (ave. particle size 9 μm) | 12.58 |
| Calcined clay[3] (ave. particle size 0.8 μm) | 1.70 |

The above ingredients were added as shown and mixed using a Cowles dispersion mixer for 10 minutes. The solution was overcoated onto the previously coated film using a meyer rod and dried at 240° F. (~115° C.) for two minutes to give a dry coating thickness of 5.0 μm.

An adhesive layer coating solution was prepared from the following ingredients.

| Ingredient | Parts By Weight |
| --- | --- |
| Methyl ethyl ketone | 77.96 |
| Toluene | 10.00 |
| Morthane ® CA-116 urethane resin[4] | 12.00 |
| Amorphous silica (ave. particle size 3 μm) | 0.04 |

The coating solution was made by mixing the methyl ethyl ketone, toluene and urethane resin for 30 minutes with a high speed Lightnin® mixer. Amorphous silica was then added and mixed for 5 minutes. The solution was overcoated onto the previously coated film using a meyer rod and dried at 240° F. (~115° C.) for two minutes to give a dry coating thickness of 2.0 μm to form the electrographic element.

The imaged layer was applied to adhesive surface of the electrographic element formed above, by using a Versatec® V-80 electrostatic plotter operated at conventional plotting conditions.

The laminating step was performed by first laying the imaged electrographic element on a sheet of 20# xerographic bond paper so that the imaged layer contacted the paper sheet. This composite was then passed through the hot nip of a hot roll laminator at a speed of 2.54 cm per second and at a pressure of 30 kg/cm². The hot nip consisted of a heated steel roll at a temperature of 240° F. (~115° C.) and a hard polyurethane backing roll of a B. F. Perkins laboratory calender. After the laminated composite had cooled to room temperature, the remaining polyethylene terephthalate support was stripped from the protective layer of the paper backed electrographic image. The protected electrographic image produced could withstand scribing with a 4H pencil with no removal of the protective layer or image.

EXAMPLE 4

An electrographic element was prepared as follows: A conductive coating solution which was Chemistat® 7005[7] was applied to a sheet of 55# laponite conductive opaque base paper (supplied as OCB90 by Chartham Paper Mill, Canterbury, Kent, U.K.) with a #6 meyer rod and dried in an air dried oven at 240° F. (~115° C.) for two minutes to give a dry coating thickness of ~2 μm.

(7) - Chemistat ® 7005 electroconductive polymer is a product of Sanyo Chemical Industries and is an aqueous solution of a polycationic water-soluble organic polymer. The light yellow liquid contains approximately 40% active ingredients, has a pH of 4.5, and a viscosity at 25° C. of 330 cps.

A dielectric layer coating solution was prepared from the following ingredients.

| Ingredient | Parts By Weight |
| --- | --- |
| Toluene | 66 |
| Propylene glycol monomethyl ether | 22 |
| Polyvinyl butyral (Butvar ® B-79 [8]) | 10 |
| Amorphous silica (ave. particle size 3 μm) | 2 |

[8] - Butvar® B-79 polyvinyl butyral (weight ave. molecular weight: 50,000–80,000) is a product of Monsanto Company, St. Louis, Missouri.

The above ingredients were added in the order shown and mixed using a Dispermat® mixer for 15 minutes. The solution was overcoated onto the previously coated film using a #14 meyer rod and dried at 240° F. (~115° C.) for two minutes to give a dry coating thickness of ~3 μm.

An adhesive layer coating solution was prepared from the following ingredients.

| Ingredient | Parts By Weight |
| --- | --- |
| Toluene | 85 |
| Propylene glycol monomethyl ether | 5 |
| Polycaprolactone[9] | 10 |

[9] - Polycaprolactone which is Tone ® Polymer P-767E biodegradable plastic resin, a product of Union Carbide.

The coating solution was made by mixing the ingredients with a high speed Lightnin® mixer until the polycaprolactone was completely in solution. The solution was overcoated onto the previously coated film using a #6 meyer rod and dried at 240° F. (~115° C.) for two minutes to give a dry coating thickness of ~2 μm to form the electrographic element.

After conditioning a sample of the electrographic element formed above, an imaged layer was applied to adhesive surface of the sample by using a Versatec® V-80 electrostatic plotter operated at conventional plotting conditions.

The laminating step was performed by first laying the imaged electrographic element on an adhesively backed sheet of 0.004 inch (~0.1 mm) thick untreated cast vinyl polymer having a removable release liner so that the imaged layer contacted the vinyl sheet. This composite was then passed through the hot nip of an IT 6000 hot roll laminator at a speed of 2 feet/minute (~1.02 cm/second), at a temperature of 250° F. (~121° C.) and at a pressure of 100 psi ~70 kg/cm². The laminated composite exiting the hot nip was cooled to room temperature (5 minutes) and the two sheets were pulled apart leaving image and dielectric coatings on the vinyl sheet and the conductive layer on the conductive paper sheet.

EXAMPLE 5

An electrographic element was prepared and processed as described in Example 4 except that the laminating step was performed by first laying the imaged electrographic element on a sheet of 0.0055 inch (~0.14 mm) thick cling vinyl coated with an ink receptive layer and backed with a 10 pt. paper liner (Flexmark® CV600 W, manufactured by Flexcon Co., Inc.) so that the imaged layer contacted the vinyl sheet. This composite was then passed through the hot nip of an IT 6000 hot roll laminator at a speed of 2 feet/minute (~1.02 cm/second), at a temperature of 250° F. (~121° C.) and at a pressure of 100 psi ~70 kg/cm². The laminated composite exiting the hot nip was cooled to room temperature (1 minute) and the two sheets were pulled apart leaving image, dielectric, and conductive coatings on the cling vinyl sheet.

EXAMPLE 6

An electrographic element was prepared as described in Example 4 except that the dielectric layer coating solution was prepared from the following ingredients.

| Ingredient | Parts By Weight |
| --- | --- |
| Toluene | 46.1 |
| Methyl ethyl ketone | 19.1 |
| Propylene glycol monomethyl ether | 3.8 |
| Polyvinyl butyral (Butvar ® B-76[10]) | 10.0 |
| Styrene-acrylonitrile copolymer (Lustran ® 33–1000[11]) | 10.0 |
| Amorphous silica (ave. particle size 3 μm) | 3.0 |

[10] - Butvaro ® B-76 polyvinyl butyral (weight ave. molecular weight: 90,000-120,000) is a product of Monsanto Company, St. Louis, Missouri.
[11] - Lustran ® 33-1000 SAN resin is a styrene-acrylonitrile copolymer (CAS No.:9003-54-7) and is a product of Monsanto Company, St. Louis, Missouri.

The resulting electrographic element was imaged and processed as described in Examples 4 and 5, except that as the resulting laminated composites exited the hot nip, the two component sheets were pulled apart for each composite, leaving image and dielectric coatings on the vinyl sheet and the conductive layer on the conductive paper sheet.

EXAMPLE 7

An electrographic element was prepared as follows: A conductive coating solution was prepared from the following ingredients:

| Ingredient | Parts By Weight |
| --- | --- |
| Ethyl alcohol | 38.0 |
| Deionized water | 38.0 |
| Chemistat ® 6300H[1] | 24.0 |

The above ingredients were Added in the order shown and mixed in a Lightnin® mixer for 10 minutes. The coating solution was then applied to a 0.002 inch (~51 μm) thick, untreated, polyethylene terephthalate film web using a reverse roll coater and hot air dried to give a dry coating weight of 0.5 pounds per 1000 square feet (~2.4 g/m²).

A dielectric layer coating solution was prepared from the following ingredients.

| Ingredient | Parts By Weight |
| --- | --- |
| Propylene glycol methyl ether acetate[12] | 5.86 |
| Toluene | 49.19 |
| Methyl ethyl ketone | 19.10 |
| Calcined clay[13] (ave. particle size 1.4 μm) | 1.00 |
| Amorphous silica slurry[14] (ave. particle size 9 μm) | 2.10 |
| Styrene-acrylonitrile copolymer (Lustran ® 33–1000[11]) | 22.75 |

| Ingredient | Parts By Weight |
| --- | --- |

[12] - Dowanol ® PM acetate is propylene glycol methyl ether acetate and is a product of Dow Chemical.
[13] - Calcined clay is Translink ® 37 calcined clay, a product of Englehard Corporation.
[14] - Amorphous silica slurry is Syloid ® 74 and is a product of Davison Chemical Division, W. R. Grace & Co., Baltimore Maryland.

The above ingredients were added as shown and mixed in a Kady Zolver tank under slow speed agitation and then allowed to mix for 60 minutes at high speed. The solution was overcoated onto the previously coated film web using a reverse roll coater and hot air dried to give a dry coating weight of 1.0 pounds per 1000 square feet (~4.8 g/m²).

An adhesive layer coating solution was prepared from the following ingredients.

| Ingredient | Parts By Weight |
| --- | --- |
| Methyl ethyl ketone | 16.00 |
| Toluene | 64.40 |
| Propylene glycol methyl ether acetate[12] | 4.00 |
| Polycaprolactone[9] | 10.00 |
| Morthane ® CA-116 urethane resin[4] | 3.00 |
| Calcined clay[13] (ave. particle size 1. 4 μm) | 0.20 |
| Amorphous silica slurry[14] (ave. particle size 9 μm) | 0.40 |

The coating solution was made by first adding the methyl ethyl ketone, toluene and propylene glycol methyl ether acetate to a 55 gallon tub containing a Lightnin® mixer. The calcined clay and the amorphous silica slurry were then added and mixed for 30 minutes. Polycaprolactone was then slowly added under agitation and allowed to mix until dissolved. The urethane resin was then slowly added under agitation and allowed to mix until dissolved. The resulting coating solution was overcoated onto the previously coated film web using a reverse roll coater and hot air dried to give a dry coating thickness of 2.0 μm, to form the electrographic element. Samples of the coated film web were slit to 36 inch (~91.4 cm) width, conditioned at 50% RH and imaged in a Calcomp® 6800 series color electrostatic plotter using standard toners and plotting conditions to form a four color imaged layer on the adhesive surface of the electrographic element.

The laminating step was performed by first laying the imaged electrographic element on a sheet of Rexcal® 4000-000 clear cast vinyl sheet (a product of Rexham Branded Products, Lancaster, S.C.) so that the imaged layer contacted the vinyl sheet. This composite was then passed through the hot nip of an IT 6000 hot roll laminator at a speed of 2 feet/minute (~1.02 cm/second), at a temperature of 250° F. (~121° C.) and at a pressure of 100 psi ~70 kg/cm². Within 15 seconds of the exit of the laminated composite from the hot nip, the polyethylene terephthalate support contiguous to the conductive layer was stripped therefrom. In this instance the conductive layer functioned as protection for the electrographic image.

EXAMPLE 8

An electrographic element was prepared and processed as described in Example 7 except that the laminating step was performed by first laying the imaged electrographic element on a sheet of Rexcal® 4000-000 clear cast vinyl sheet so that the imaged layer contacted the vinyl sheet. This composite was then laminated in a Heat Lamp Vacuum Applicator (a product of Dayco Industries, Niles, Mich.), using a bake temperature of 245° F. (~118° C.) and a bake time of 10 minutes. Within 15 seconds of the removal of the laminated composite from the Heat Lamp Vacuum Applicator, the polyethylene terephthalate support contiguous to the conductive layer was stripped therefrom. In this instance the conductive layer functioned as protection for the electrographic image.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A process for forming an electrographic image on a receptor substrate comprising the steps:
    A) electrographically producing on the surface of an electrographic element a toned image layer to form an imaged electrographic element, wherein the electrographic element comprises in the order given:
        a) a carrier layer,
        b) a conductive layer,
        c) a dielectric layer, and
        d) a substantially tack-free, adhesive layer which is activated at a pressure and a temperature which is above ambient pressure and temperature of the electrographic element:
        wherein the toned image layer is adhered to the surface of the adhesive layer; and
    B) pressure laminating the receptor substrate to the toned image layer at the temperature which is above the ambient temperature, to activate the adhesive layer to form a laminated image element.

2. The process of claim 1 wherein the laminated image element formed in Step (B), is returned to the ambient temperature.

3. The process of claim 1 wherein the carrier layer is removed from the conductive layer of the laminated image element formed in Step (B).

4. The process of claim 1 wherein the receptor substrate is pressure laminated to the toned image layer of the imaged electrographic element under an applied pressure of about atmospheric pressure or greater.

5. The process of claim 1 wherein the receptor substrate is pressure laminated to the toned image layer of the imaged electrographic element under an applied pressure between about 0.5 kg/cm$^2$ (7 p.s.i.) to about 100 kg/cm$^2$ (1422 p.s.i.).

6. The process of claim 1 wherein the receptor substrate is pressure laminated to the toned image layer of the imaged electrographic element at a temperature of about 100° C. or greater, 7. The process of claim 1 wherein the receptor substrate is pressure laminated to the toned image layer of the imaged electrographic element by passing the imaged electrographic element and the receptor substrate in surface-to-surface contact through a nip formed by pressure rollers to form the laminated image element.

8. The process of claim 7, wherein at least the receptor substrate or the imaged electrographic element is heated to a temperature of about 100° C. or greater.

9. The process of claim 1 wherein the carrier layer is removed from the laminated image element when the laminated image element is at a temperature of about 100° C. or greater.

10. The process of claim 1 wherein the carrier layer is also conductive.

11. The process of claim 1 wherein the carrier layer and the conductive layer of the electrographic element, are a single conductive carrier layer.

12. A process for forming an electrographic image on a receptor substrate comprising the steps:
    A) electrographically producing on the surface of an electrographic element a toned image layer to form an imaged electrographic element, wherein the electrographic element comprises in the order given;
        a) a carrier layer,
        b) a conductive layer,
        c) a dielectric layer, and
        d) a substantially tack-free, adhesive layer which is activated at a pressure and a temperature which is above ambient pressure and temperature of the electrographic element;
        wherein the toned image layer is adhered to the surface of the adhesive layer;
    B) pressure laminating the receptor substrate to the toned image layer at the temperature which is above the ambient temperature, to activate the adhesive layer to form a laminated image element; and
    C) removing the carrier layer from a portion of the laminated image element within about 60 seconds from the time at which the portion of the laminated image element exits the nip of the pressure rollers.

13. A process for forming an electrographic image on a receptor substrate comprising the steps:
    A) electrographically producing on the surface of an electrographic element a toned image layer to form an imaged electrographic element, wherein the electrographic element comprises in the order given:
        a) a carrier layer,
        b) a release layer,
        c) a conductive layer,
        d) a dielectric layer, and
        e) a substantially tack-free, adhesive layer which is activated at a pressure and a temperature which is above ambient pressure and temperature of the electrographic element;
        wherein the toned image layer is adhered to the surface of the adhesive layer;
    B) pressure laminating the receptor substrate to the tuned image layer at the temperature which is above the ambient temperature, to activate the adhesive layer to form a laminated image element; and
    C) removing the carrier layer from the release layer of the laminated image element formed in Step (B).

14. A process for forming an electrographic image on a receptor substrate comprising the steps:
    A) electrographically producing on the surface of an electrographic element; a toned image layer to form an imaged electrographic element, wherein the electrographic element comprises in the order given:
        a) a single conductive carrier layer,
        b) a dielectric layer, and
        c) a substantially tack-free, adhesive layer which is activated at a pressure and a temperature which is above ambient pressure and temperature to the electrographic element;
        wherein the toned image layer is adhered to the surface of the adhesive layer; and
    B) pressure laminating the receptor substrate to the toned image layer at the temperature which is above the ambient temperature, to activate the adhesive layer to form a laminated image element C) removing the single conductive carrier layer from the dielectric layer of the laminated image element formed in step (B).

15. The process to claim 14 wherein the element further comprises a release layer which is interposed between the dielectric layer (c) and the single conductive carrier layer, and wherein the single conductive carrier layer is removed from the laminated image element formed in Step (B).

16. A process for forming an electrographic image on a receptor substrate comprising the steps:

A) electrographically producing on the surface of an electrographic element a toned image layer to form an imaged electrographic element, wherein the electrographic element comprises in the order given:
   a) a carrier layer,
   b) a protective layer,
   c) a dielectric layer, and
   d) a substantially tack-free, adhesive layer which is activated at a pressure and a temperature which is above ambient pressure and temperature of the electrographic element;

wherein the toned image layer is adhered to the surface of the adhesive layer;

B) pressure laminating the receptor substrate to the toned image layer at the temperature which is above the ambient temperature, to activate the adhesive layer to form a laminated image element; and C) removing the carrier layer from the protective layer of the laminated image element formed in Step (B).

\* \* \* \* \*